(12) United States Patent
Wang

(10) Patent No.: US 8,264,109 B2
(45) Date of Patent: Sep. 11, 2012

(54) STATOR FOR EXTERNAL ROTOR MOTOR

(75) Inventor: Xiongcheng Wang, Zhongshan (CN)

(73) Assignee: Zhongshan Broad-Ocean Motor Co., Ltd., Zhongshan (CN)

(*) Notice: Subject to any disclaimer, the term of this patent is extended or adjusted under 35 U.S.C. 154(b) by 369 days.

(21) Appl. No.: 12/726,540

(22) Filed: Mar. 18, 2010

(65) Prior Publication Data
US 2010/0259119 A1  Oct. 14, 2010

(51) Int. Cl.
*H02K 11/00* (2006.01)
(52) U.S. Cl. ........................................ 310/71
(58) Field of Classification Search ............ 310/71, 310/89
See application file for complete search history.

(56) References Cited

U.S. PATENT DOCUMENTS

| 7,663,285 | B2* | 2/2010 | Yumoto et al. | 310/194 |
| 7,936,100 | B2* | 5/2011 | Naganawa et al. | 310/71 |
| 2009/0273248 | A1* | 11/2009 | Schwaiger | 310/71 |
| 2010/0019592 | A1* | 1/2010 | Altindis | 310/71 |

* cited by examiner

*Primary Examiner* — Nguyen N Hanh
(74) *Attorney, Agent, or Firm* — Matthias Scholl P.C.; Matthias Scholl

(57) ABSTRACT

A stator for an external rotor motor, containing at least a stator core (1) having multiple teeth (4) and a shaft (3), a stator winding (2), multiple slots (5), a pair of end plates (6), a patch board (7) having a first through hole (8), a power wire (11), and a fastening device (9). The shaft (3) is disposed at the center of the stator core (1). The slot (5) is formed between adjacent teeth (4) of the stator core (1). The stator winding (2) is received in the slot (5) and wrapped around the teeth (4). The patch board (7) is disposed above one of the end plates (6). The shaft (3) passes through the first through hole (8) of the patch board (7). The fastening device (9) is disposed at the top of the patch board (7) and operates to fix the weld-connecting portion (10).

18 Claims, 5 Drawing Sheets

STATOR FOR EXTERNAL ROTOR MOTOR

CROSS-REFERENCE TO RELATED APPLICATIONS

Pursuant to 35 U.S.C. §119 and the Paris Convention Treaty, this application claims the benefit of Chinese Patent Application No. 200920054631.6 filed on Apr. 13, 2009, the contents of which are incorporated herein by reference.

BACKGROUND OF THE INVENTION

1. Field of the Invention

The invention relates to a stator, and more particularly to a stator for an external rotor motor.

2. Description of the Related Art

A conventional stator for an external rotor motor comprises a stator winding and a power wire. A head of the stator winding is connected to the power wire via welding, and insulators are injected on a solder joint therebetween. However, there are several problems with the conventional stator: firstly, the solder joint is easy to be broken; secondly, connection between the head of the stator winding and the power wire is unstable, and the power wire is easy to be detached; thirdly, there is no fixing device at the solder joint between the head of the stator winding and the power wire, and the head of the stator winding and the power wire are disorderly distributed in the motor and may contact with other components of the motor, which affects normal operation thereof, damages other components thereof, and reduces work life thereof.

SUMMARY OF THE INVENTION

In view of the above-described problem, it is one objective of the invention to provide a stator for an external rotor motor that is capable of addressing the above-mentioned problems.

To achieve the above objectives, in accordance with one embodiment of the invention, provided is a stator for an external rotor motor, comprising a stator core having multiple teeth and a shaft, a stator winding, multiple slots, a pair of end plates, a patch board having a first through hole, a power wire, and a fastening device, wherein the shaft is disposed at the center of the stator core, the slot is formed between adjacent teeth of the stator core, the stator winding is received in the slot and wrapped around the teeth of the stator core, insulators are injected in one end of the stator core and in the slot, the end plate is formed via insulators on one end of the stator core, the patch board is disposed above one of the end plates, the shaft passes through the first through hole of the patch board, a head of the stator winding is welded with the power wire to form a weld-connecting portion, and the fastening device is disposed at the top of the patch board and operates to fix the weld-connecting portion.

In a class of this embodiment, multiple recesses are disposed at the edge of the patch board.

In a class of this embodiment, the head of the stator winding passes through the recess, enters the fastening device, and is welded with the power wire.

In a class of this embodiment, the fastening device comprises two groups of protruding portions opposite to each other and disposed at the top of the patch board.

In a class of this embodiment, a first groove is disposed between the two groups of protruding portions.

In a class of this embodiment, a flange is extended from both ends of one group of protruding portions towards the first groove.

In a class of this embodiment, a pressing buckle is extended from the center of the other group of protruding portions towards the first groove, and operates to fix the weld-connecting portion.

In a class of this embodiment, a fixing clamp is extended from one end of the patch board.

In a class of this embodiment, the shaft has a second through hole and a shaft hole.

In a class of this embodiment, the power wire led out from the fastening device is fixed via the fixing clamp, abuts against the top of the patch board, enters the first through hole, and is led out from the shaft hole via the second through hole of the shaft.

In a class of this embodiment, a positioning pole and a buckling rod are disposed on the end plate.

In a class of this embodiment, a positioning post is disposed at the top of the positioning pole, the patch board has a positioning hole, a receiving hole and a third through hole, and abuts against the positioning post, and the positioning post passes through the positioning hole.

In a class of this embodiment, a pair of inverted buckles opposite to each other are disposed at the top of the buckling rod, a second groove is disposed between the inverted buckles, and the inverted buckles passes through the receiving hole of the patch board whereby fixing the patch board.

In a class of this embodiment, a pipe-shaped component is disposed on the end plate and operates to receive a ground wire, and the pipe-shaped component enters the third through hole of the patch board whereby fixing the patch board.

In a class of this embodiment, the grounded wire enters the first through hole via the third through hole.

In a class of this embodiment, a slot base is disposed on the end plate and operates to receive a temperature monitor, and a fourth through hole is disposed on the patch board and above the slot base.

In a class of this embodiment, the buckling pole, the positioning pole, the pipe-shaped component, the slot base, and the end plate are integrally formed.

In a class of this embodiment, the stator core is made via an overlapping stamping method.

Advantages of the invention comprise: 1) the patch board is disposed above one end of the stator core, the fastening device is disposed at the top of the patch board, and the weld-connecting portion comprising the head of the stator winding and the power wire is disposed in the fastening device, which improves connection between the head of the stator winding and the power wire; 2) the head of the stator winding and the power wire are orderly distributed in the motor and do not contact with other components of the motor, which ensures normal operation of the motor and increases work life thereof; 3) the invention features reasonable distribution and compact structure; and 4) the fastening device features simple structure, convenient use, and low production cost.

BRIEF DESCRIPTION OF THE DRAWINGS

Detailed description will be given below in conjunction with accompanying drawings, in which.

DETAILED DESCRIPTION OF THE EMBODIMENTS

Figure 1:
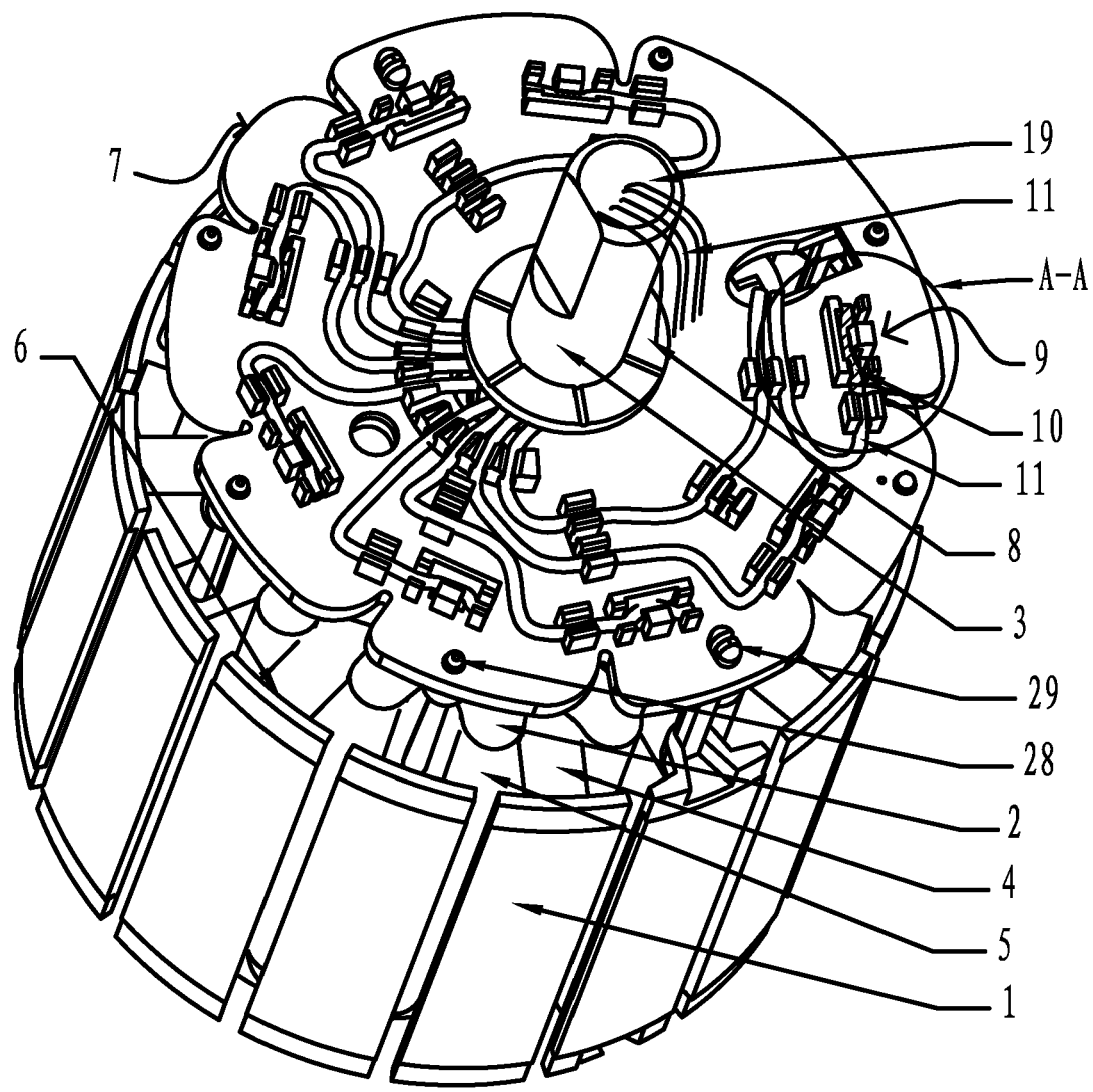
FIG. 1 is a schematic view of a stator for an external rotor motor of an embodiment of the invention.
Figure 2:
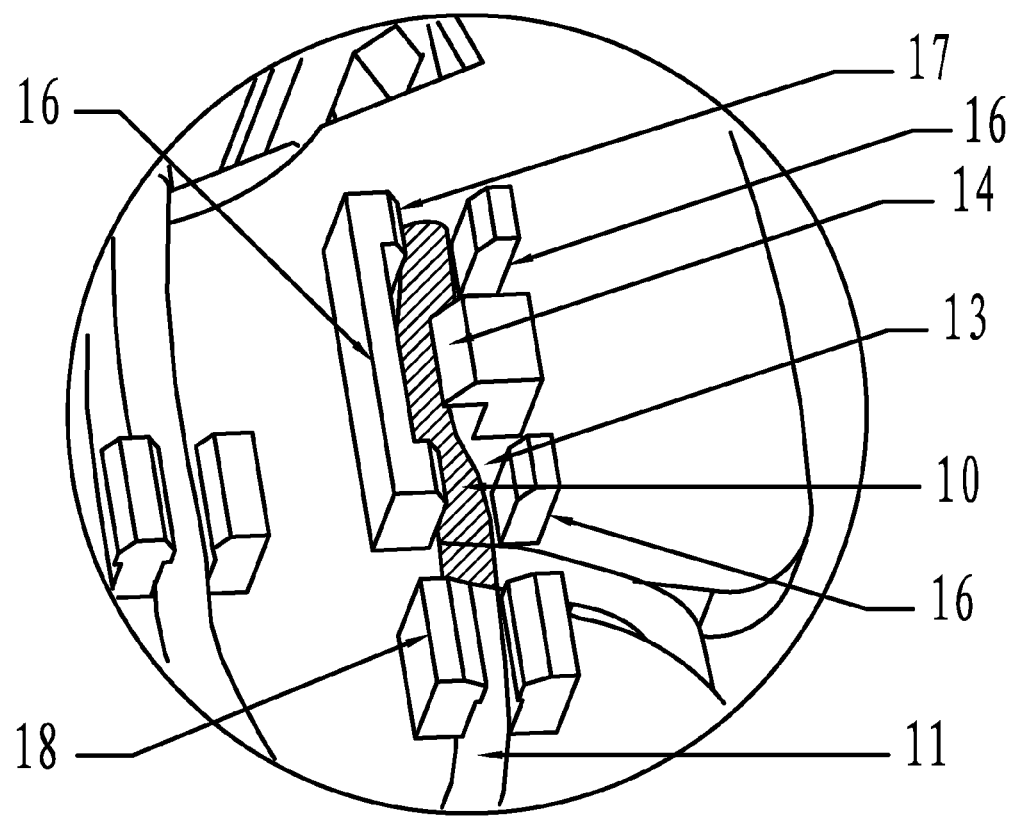
FIG. 2 is a partially enlarged view of FIG. 1 along an A-A line.
Figure 3:
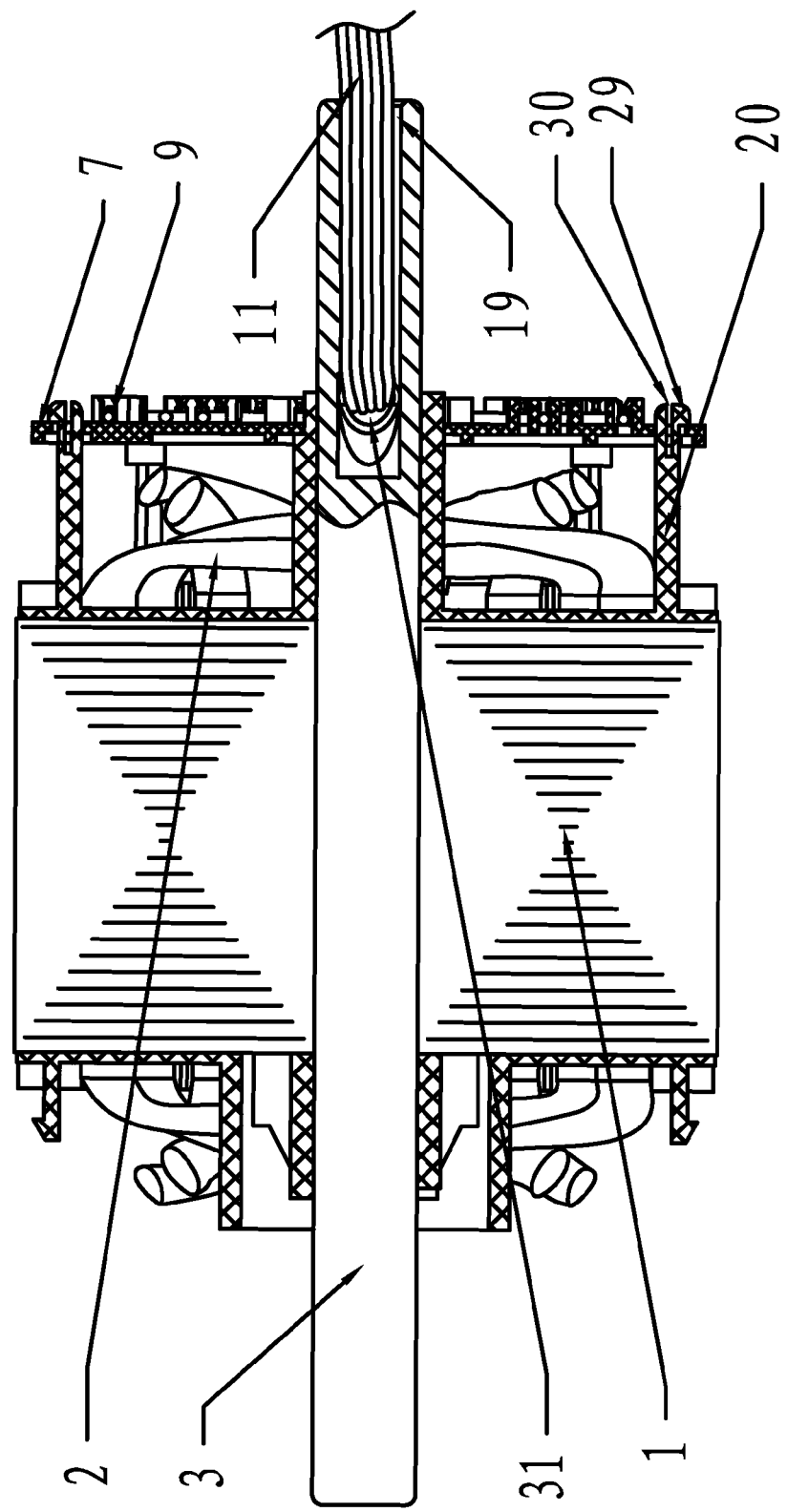
FIG. 3 is a cross-sectional view of FIG. 1.
Figure 4:
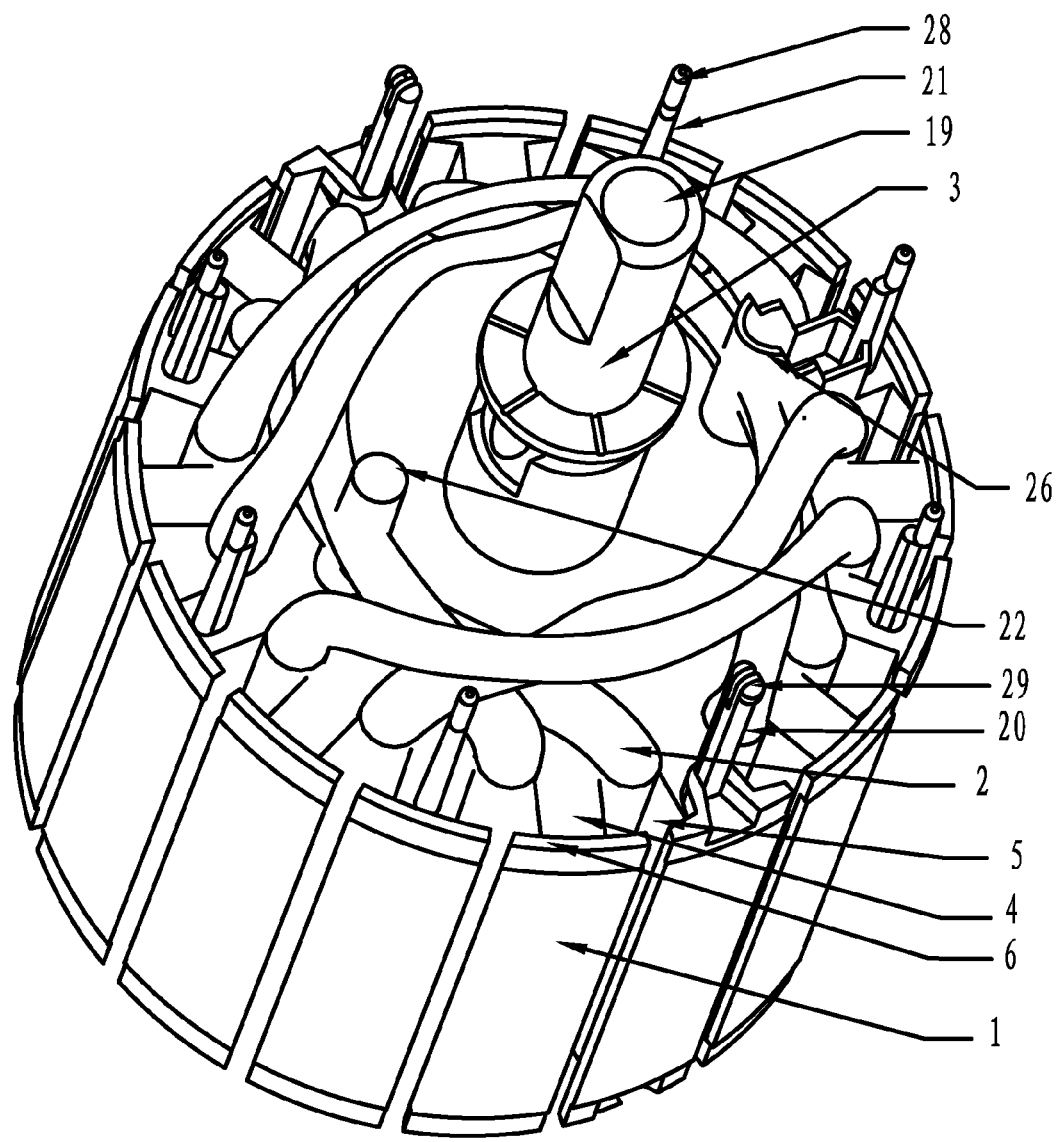
FIG. 4 is a schematic view of a stator without a patch board of the invention.
Figure 5:
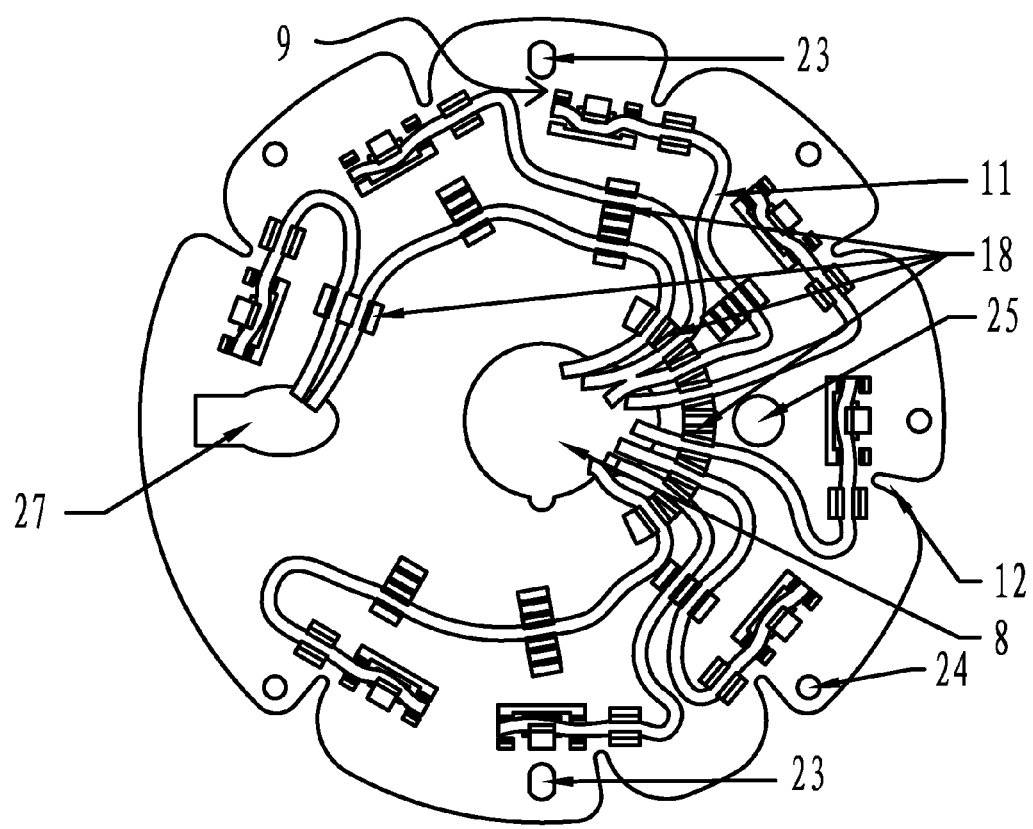
FIG. 5 is a schematic view of a patch board of the invention.

As shown in FIG. 1, A stator for an external rotor motor of the invention comprises a stator core 1 having multiple teeth 4 and a shaft 3, a stator winding 2, multiple slots 5, a pair of end plates 6, a patch board 7 having a first through hole 8, a power wire 11, and a fastening device 9.

The shaft 3 is disposed at the center of the stator core 1.

The slot 5 is formed between adjacent teeth 4 of the stator core 1, and passes through the first through hole 8 of the patch board 7.

The stator winding 2 is received in the slot 5 and wrapped around the teeth 4 of the stator core 1.

Insulators are injected in one end of the stator core 1 and in the slot 5.

The end plate 6 is formed via insulators on one end of the stator core 1.

The patch board 7 is disposed above one of the end plates 6.

A head of the stator winding 2 is welded with the power wire 11 to form a weld-connecting portion 10.

The fastening device 9 is disposed at the top of the patch board 7 and operates to fix the weld-connecting portion 10.

As shown in FIGS. 1-5, multiple recesses 12 are disposed at the edge of the patch board 7.

The head of the stator winding 2 passes through the recess 12, enters the fastening device 9, and is welded with the power wire 11.

The fastening device 9 comprises two groups of protruding portions 16 opposite to each other and disposed at the top of the patch board 7.

A first groove 13 is disposed between the two groups of protruding portions 16.

A flange 17 is extended from both ends of one group of protruding portions 16 towards the first groove 13.

A pressing buckle 14 is extended from the center of the other group of protruding portions 16 towards the first groove 13, and operates to fix the weld-connecting portion 10.

A fixing clamp 18 is extended from one end of the patch board 7.

The shaft 3 has a second through hole 31 and a shaft hole 19.

The power wire 11 led out from the fastening device 9 is fixed via the fixing clamp 18, abuts against the top of the patch board 7, enters the first through hole 8, and is led out from the shaft hole 19 via the second through hole 31 of the shaft 3.

A positioning pole 21 and a buckling rod 20 are disposed on the end plate 6.

A positioning post 28 is disposed at the top of the positioning pole 21,

The patch board 7 has a positioning hole 24, a receiving hole 23 and a third through hole 25, and abuts against the positioning post 28. The positioning post 28 passes through the positioning hole 24.

A pair of inverted buckles 29 opposite to each other are disposed at the top of the buckling rod 20. A second groove 30 is disposed between the inverted buckles 29. The inverted buckles 29 passes through the receiving hole 23 of the patch board 7 whereby fixing the patch board 7.

A pipe-shaped component 22 is disposed on the end plate 6 and operates to receive a ground wire. The pipe-shaped component 22 enters the third through hole 25 of the patch board 7 whereby fixing the patch board 7.

The grounded wire enters the first through hole 8 via the third through hole 25.

A slot base 26 is disposed on the end plate 6 and operates to receive a temperature monitor, and a fourth through hole 27 is disposed on the patch board 7 and above the slot base 26.

The buckling pole 20, the positioning pole 21, the pipe-shaped component 22, the slot base 26, and the end plate 6 are integrally formed.

The stator core 1 is made via an overlapping stamping method.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A stator for an external rotor motor, comprising
a stator core (1) having multiple teeth (4) and a shaft (3);
a stator winding (2);
multiple slots (5);
a pair of end plates (6);
a patch board (7) having a first through hole (8);
a power wire (11); and
a fastening device (9)
wherein
said shaft (3) is disposed at the center of said stator core (1);
said slot (5) is formed between adjacent teeth (4) of said stator core (1);
said stator winding (2) is received in said slot (5) and wrapped around said teeth (4) of said stator core (1);
insulators are injected in one end of said stator core (1) and in said slot (5);
said end plate (6) is formed via insulators on one end of said stator core (1);
said patch board (7) is disposed above one of said end plates (6);
said shaft (3) passes through said first through hole (8) of said patch board (7);
a head of said stator winding (2) is welded with said power wire (11) to form a weld-connecting portion (10); and
said fastening device (9) is disposed at the top of said patch board (7) and operates to fix said weld-connecting portion (10).

2. The stator of claim 1, wherein multiple recesses (12) are disposed at the edge of said patch board (7).

3. The stator of claim 2, wherein the head of said stator winding (2) passes through said recess (12), enters said fastening device (9), and is welded with said power wire (11).

4. The stator of claim 1, wherein said fastening device (9) comprises two groups of protruding portions (16) opposite to each other and disposed at the top of said patch board (7).

5. The stator of claim 4, wherein a first groove (13) is disposed between the two groups of protruding portions (16).

6. The stator of claim 4, wherein a flange (17) is extended from both ends of one group of protruding portions (16) towards said first groove (13).

7. The stator of claim 6, wherein a pressing buckle (14) is extended from the center of the other group of protruding portions (16) towards said first groove (13), and operates to fix said weld-connecting portion (10).

8. The stator of claim 1, wherein a fixing clamp (18) is extended from one end of said patch board (7).

9. The stator of claim 8, wherein said shaft (3) has a second through hole (31) and a shaft hole (19).

10. The stator of claim 9, wherein said power wire (11) led out from said fastening device (9) is fixed via said fixing clamp (18), abuts against the top of said patch board (7), enters said first through hole (8), and is led out from said shaft hole (19) via said second through hole (31) of said shaft (3).

11. The stator of claim 1, wherein a positioning pole (21) and a buckling rod (20) are disposed on said end plate (6).

12. The stator of claim 11, wherein
a positioning post (28) is disposed at the top of said positioning pole (21);

said patch board (7) has a positioning hole (24), a receiving hole (23) and a third through hole (25), and abuts against said positioning post (28); and said positioning post (28) passes through said positioning hole (24).

13. The stator of claim 11, wherein a pair of inverted buckles (29) opposite to each other are disposed at the top of said buckling rod (20);

a second groove (30) is disposed between said inverted buckles (29); and said inverted buckles (29) passes through said receiving hole (23) of said patch board (7) whereby fixing said patch board (7).

14. The stator of claim 12, wherein a pipe-shaped component (22) is disposed on said end plate (6) and operates to receive a ground wire; and said pipe-shaped component (22) enters said third through hole (25) of said patch board (7) whereby fixing said patch board (7).

15. The stator of claim 14, wherein said grounded wire enters said first through hole (8) via said third through hole (25).

16. The stator of claim 14, wherein a slot base (26) is disposed on said end plate (6) and operates to receive a temperature monitor, and a fourth through hole (27) is disposed on said patch board (7) and above said slot base (26).

17. The stator of claim 16, wherein said buckling pole (20), said positioning pole (21), said pipe-shaped component (22), said slot base (26), and said end plate (6) are integrally formed.

18. The stator of claim 1, wherein said stator core (1) is made via an overlapping stamping method.

* * * * *